United States Patent Office 3,344,167
Patented Sept. 26, 1967

3,344,167
DIFLUORAMINOALKYL NITRATES
William E. Tyler III, New Providence, and John R. Lovett, Edison, N.J., assignors to Esso Research and Engineering Company, a corporation of Delaware
No Drawing. Filed Mar. 19, 1962, Ser. No. 181,839
6 Claims. (Cl. 260—467)

This invention relates to a method for the preparation of nitrate esters from nitramines, more particularly to the preparation of the highly energetic difluoramino alkyl nitrates having both an $NF_2$ group and a nitrate ester group (—O—$NO_2$) linked to the same carbon atom, as in the novel compound 1,2-bis-(difluoramino) ethyl nitrate having the formula:

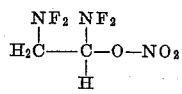

In the formulation of propellant compositions, there has been found to be a need for oxidizers which contain fluorine with an additional amount of oxygen in high proportion to carbon in the molecule. This is the reason for attempts to find methods for synthesizing compounds of the kind herein described. Considerable effort has been expended in this synthesis area because it is difficult to form compounds of this type by conventional methods of esterification.

In accordance with the present invention, a new approach to the preparation of the nitrate esters has been discovered. This approach involves the reaction of a nitramine with nitrosyl chloride (NOCl) in the presence of an absorbent for HCl in an inert liquid diluent at suitable low reaction temperatures which permit the reaction to proceed safely, e.g., temperatures in the range of $-30°$ to $+75°$ C., preferably below 10° C. to 30° C. Higher pressure than atmospheric pressure is used with increased reaction temperatures.

A number of methods are known for preparing nitramines useful as reactants in the synthesis of nitrate esters in accordance with the present invention. These nitramines are represented by the following general formula:

$$R(NHNO_2)_n$$

where R represents an organic radical, e.g., alkyl, alkylene, cycloalkyl, aralkyl, and such radicals having $NF_2$ group substituents; $n$ being the number 1 for a single nitramine group (—$NHNO_2$) linked to such an organic radical that is monovalent and being 2 for two nitramine groups linked to two carbon atoms in such organic radicals that are divalent. In general, the organic radicals of interest contain about 2 to 10 carbon atoms.

In general, the nitramines are unstable and tend to explode when heated, e.g., to temperatures of 75° C. and higher.

The following examples are intended to illustrate the preparation of nitrate esters from the $R(NHNO_2)_n$ compounds.

EXAMPLE 1

6 g. of butyl nitramine and 10 g. of anhydrous $Na_2CO_3$ were added to 150 cc. of $CH_2Cl_2$ and the mixture was then cooled to $-20°$ C. 5 ml. of NOCl in a stream of $N_2$ were passed into the cooled mixture. After stirring the mixture containing reaction products of NOCl reacted with the butyl nitramine for one-half hour, the mixture was allowed to warm to room temperature (about 25° C.) and the solution containing the reaction product was filtered away from solids in the mixture. After removing the $CH_2Cl_2$ solvent by distillation from the filtered solution, the residue yielded pure butyl nitrate having an infrared (IR) spectrum and gas chromatography retention time identical with an authentic sample of butyl nitrate. The reaction which took place is represented by an overall equation as follows:

$$CH_3(CH_2)_2CH_2NHNO_2 + NOCl \rightarrow CH_3(CH_2)_2CH_2NON_2 + N_2 + HCl$$

The HCl by-product was reacted with the sodium carbonate to form solid sodium chloride. The most challenging problem involves the synthesis of nitrate esters from nitramines having an oxidizing group or substituent, such as a difluoramino group (—$NF_2$), attached to the carbon atom which is directly linked to the nitramine group (—$NHNO_2$). The difluoramino-nitramines can be prepared with suitable precautions by nitration of an $NF_2$-substituted hydrocarbon radical attached to an isocyanate group with mixed acid (50/50 $HNO_3/H_2SO_4$) used as a nitrating agent at a low reaction temperature of about 0° C.

The compound, 1,2-bis-($NF_2$) ethyl nitramine, was prepared by the nitration of 1,2-bis-($NF_2$) ethyl isocyanate. The crude nitramine product thus obtained is a colorless high-boiling liquid which exhibits a tendency to explode spontaneously on storage. Careful distillation of the crude product yielded a high-purity nitramine distillate product which was stored several weeks at room temperature without incident. To obtain the purified product, a triple distillation was employed. The pure nitramine product was identified by an elemental analysis close to the theoretical calculated composition of 12.5% C, 29.2% N, 39.6% F, and a nitrogen to carbon mole ratio of close to 2.0. This nitramine product has a boiling point of 50° to 51° C. at 0.2 mm. Hg abs. pressure. The infrared spectrum and nuclear magnetic resonance spectrum were consistent with the theoretical structural formula:

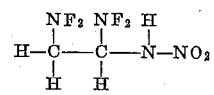

To convert the difluoramino-ethyl nitramine to the nitrate ester, the reaction was carried out by bubbling nitrosyl chloride (NOCl) into a cold ($-5°$ C. or lower) solution of the nitramine dissolved in inert diluent, such as methylene chloride, stirred in contact with a tenfold excess of anhydrous sodium carbonate which functioned as an HCl scavenger. During the reaction, a blue color characteristic of nitrosyl compounds was observed. Filtration of the reaction mixture to remove excess sodium carbonate and sodium chloride formed was followed by removal of solvent from the filtered solution. The following example illustrates with more detail the procedure.

EXAMPLE 2

2 g. of 1,2-bis-(difluoramino) ethyl nitramine and 10 g. of anhydrous sodium carbonate were added to 100 ml. of methylene chloride to form a mixture which was then cooled to $-20°$ C., and 4 ml. of NOCl were added in a stream of $N_2$ to this mixture. The resulting reaction mixture was stirred at $-20°$ C. for one hour and then allowed to become warmed to room temperature (20° to 25° C.), and the solids were removed from the solution of the reaction mixture by filtration. The solvent was stripped from the solution and the residue was distilled to yield a product having an IR and NMR spectrum consistent with the structural composition of 1,2-bis-(difluoramino) ethyl nitrate. A sample of the product gave an elemental analysis which compared favorably with the calculated composition for 1,2-bis-(difluoramino) ethyl nitrate represented by the following formula:

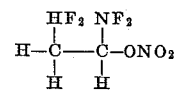

Table I

|  | $C_2H_3F_4N_3O_3$ | | |
| --- | --- | --- | --- |
|  | Calc'd | Found (1) | Found (2) |
| Percent C | 12.4 | 13.0 | 12.8 |
| Percent N | 21.7 | 19.4 | 21.1 |
| Percent F | 39.1 | 36.9 | 42.0 |

(1) and (2)—Separate samples tested.

The elemental analyses agree reasonably well with the theoretical composition and further purification is indicated to give closer agreement.

It is believed that the reaction takes the following path:

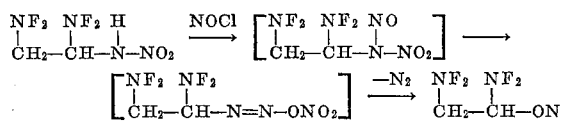

This novel reaction for conversion of nitramines to nitrate esters may also be used on various other nitramines, as for example,

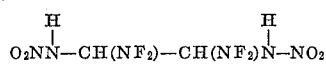

In general, the difluoramino-nitrate ester compounds are of value as components in liquid and solid rocket fuels. They have the merit in solid propellants of being high-energy plasticizers of established nitrocellulose binders and other polymeric binders containing $NF_2$ groups or both $NF_2$ groups and nitro or nitrato groups. The highly novel characteristics of the 1,2-bis-(difluoramino) ethyl nitrate product produced in accordance with the present invention have been determined with respect to its use in a number of propellant formulations, as for example, the following:

Table II. Propellant compositions

Oxidizer and plasticizer=1,2-bis-($NF_2$) ethyl nitrate, $C_2H_3(NF_2)_2ONO_2$

Components: Wt. percent
- $C_2H_3(NF_2)_2ONO_2$ _____ 55.94
- $N_2H_5C(NO_2)_3$ _____ 31.06
- B Powder _____ 3.00
- Binder _____ 10.00

The above-described composite, hydrazine nitroformate, is shown to be used with boron powder and with the polybutadiene-$N_2F_4$ adduct polymer binder of composition $[C_4H_6(NF_2)_{1.3}]$. This composite has been calculated to have a specific impulse (Isp.) of 289. In place of the hydrazine nitroformate, other oxidizers may be used, such as hexanitroethane, in a proportion of 29 wt. percent with 1 wt. percent of boron powder and 20 wt. percent of the binder to obtain a composite calculated to have an Isp. of 291 seconds. It has thus been found that it is possible to replace a substantial portion of the nitro group containing oxidizers by the oxidizers containing both $NF_2$ and nitrate oxidizing groups and arrive at a desired high specific impulse propellant.

EXAMPLE 3

For the preparation of 1,2-bis-(difluoramino) ethylene dinitrate, the starting reactant used is 1,2-bis-(difluoramino) ethylene dinitramine and the procedure is as has been described. A sufficient proportion of nitrosyl chloride is bubbled into the cold dinitramine solution for reaction with each of the nitramine groups. Similarly, anhydrous sodium carbonate is employed to absorb the HCl formed in the reaction, and the reaction is carried out under anhydrous conditions using a reaction temperature in the range of —30° to +75° C. The desired product is then separated from excess sodium carbonate and sodium chloride by filtration and is freed of inert liquid organic diluent.

The ease with which NOCl reacts with the nitramine function under mild reaction conditions makes this reaction useful, for producing a variety of nitrate esters which have been difficult by other nitration procedures. With the present method of forming nitrate esters, the low reaction temperatures help avoid undesired oxidation and overnitration reactions. The presence of moisture can be avoided also. Nitrate esters that are thus obtainable can be used for various purposes, such as intermediates, and in preparing compounds that are of value in biological chemistry. Some of the nitrate esters are mostly useful as fuel additives; others are useful as explosives.

What is claimed is:

1. 1,2-bis-(difluoramino) ethyl nitrate having the composition $C_2H_3(NF_2)_2ONO_2$.

2. The method for preparation of a nitrate ester which comprises, reacting NOCl with a nitramine of the formula $R(NHNO_2)_n$, wherein R represents an organic radical of the group consisting of alkyl, alkylene, cycloalkyl, aralkyl, and such radicals with $NF_2$ substituent groups, $n$ being the number 1 for a single nitramine group linked to the organic radical that is monovalent and being 2 for two nitramine groups linked to two carbon atoms in the organic radical that is divalent, carrying out said reaction in the presence of an absorbent for hydrogen chloride which is liberated and at a suitably low temperature in the range of —30° to +75° C., and recovering the resulting nitrate ester in which the nitramine groups are replaced by —$ONO_2$ groups.

3. Method for the preparation of a nitrate ester which comprises, reacting an alkyl nitramine with NOCl at a temperature in the range of —30° to +75° C. in the presence of a hydrogen chloride absorbent, and recovering the resulting alkyl nitrate ester.

4. Method for the preparation of a nitrate ester of a difluoramino-substituted alkyl nitramine which comprises, reacting the nitramine in an inert liquid organic diluent at a temperature in the range of —30° to + 75° C. in the presence of anhydrous sodium carbonate with nitrosyl chloride passed into said mixture, stirring the reaction mixture of the nitramine solution, sodium carbonate and nitrosyl chloride, at a temperature in the range of —30° to +75° C. for a period sufficient to complete the reaction, warming the resulting solution of product, filtering the solution to remove excess solid sodium carbonate and sodium chloride, stripping from the filtered solution inert diluent, and recovering a difluoraminoalkyl nitrate as product.

5. The method set forth in claim 4, wherein the difluoramino-substituted alkyl nitramine is 1,2-bis-($NF_2$) ethyl nitramine.

6. Method for the preparation of a dinitrate ester of 1,2-bis-(difluoramino) ethylene dinitramine which comprises, reacting the dinitramine in an inert liquid organic diluent at a temperature in the range of —30° to +75° C. in the presence of anhydrous sodium carbonate with nitrosyl chloride passed into said mixture, stirring the reaction mixture of the dinitramine solution, sodium carbonate and nitrosyl chloride, at a temperature in the range of —30° to +75° C. for a period sufficient to complete the reaction, warming the resulting solution of product, filtering the solution to remove excess solid sodium carbonate and sodium chloride, stripping from the filtered solution inert diluent, and recovering bis-(difluoramino) ethylene dinitrate as product.

References Cited

Hoffman: Chem. Reviews, vol. 62, pp. 12 to 18 (1962).

BENJAMIN R. PADGETT, *Primary Examiner.*

OSCAR R. VERTIZ, CARL D. QUARFORTH,
*Examiners.*

J. W. WHISLER, L. A. SEBASTIAN,
*Assistant Examiners.*